C. P. BROWN.
MUSIC LEAF TURNER.

No. 178,107. Patented May 30, 1876.

WITNESSES:
Julius Wildie
N. H. Sherburne

INVENTOR:
Cyril P. Brown.
By Sherburne & Co,
Attorneys.

UNITED STATES PATENT OFFICE.

CYRIL P. BROWN, OF HUDSON, MICHIGAN, ASSIGNOR OF ONE-HALF HIS RIGHT TO WHITING G. PRESS, OF CHICAGO, ILLINOIS.

IMPROVEMENT IN MUSIC-LEAF TURNERS.

Specification forming part of Letters Patent No. 178,107, dated May 30, 1876; application filed December 9, 1875.

*To all whom it may concern:*

Be it known that I, CYRIL P. BROWN, of Hudson, in the county of Lenawee and State of Michigan, have invented a Loop for Turning Music-Leaves; and I do hereby declare the following to be a full, clear, and exact description thereof, which will enable others skilled in the art to which it appertains to make and use the same, reference being had to the accompanying drawing, forming part of this specification, in which—

Figure 1:
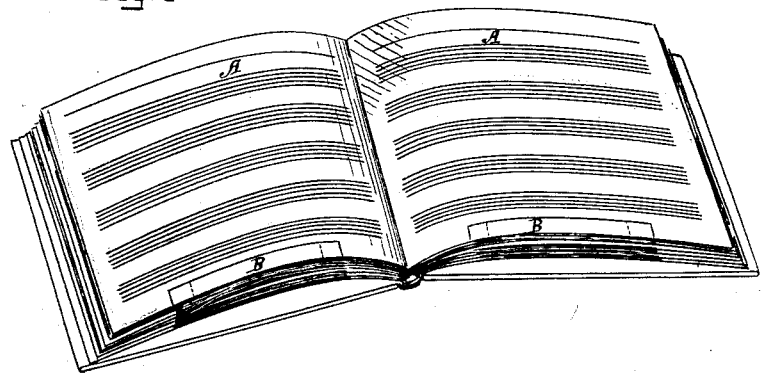
Figure 2:

Figure 1 is a perspective view of a music-book when opened, showing a plan view of the loop constituting my said invention; and Fig. 2 is a transverse section of one of the leaves detached, cutting the loop through the center.

Similar letters of reference indicate like parts in both figures of the drawing.

The object of my invention is to provide an attachment to the leaves of music-books, whereby the same may be turned consecutively by means of any suitable machinery; and to that end it consists in the combination, with the leaves of the book, of a ribbon of cloth, paper, or other suitable material, attached at its ends to the top or bottom of each page, forming a loop adapted to receive the operating-arm of the device employed to turn the leaves, as will be more fully understood by the following description and claim.

In the drawing, A A represent the leaves of an ordinary music-book, and B B the ribbons or loops. These ribbons are constructed of cloth, paper, or other suitable material of the proper width, and are attached at each end to the surface of the leaves at the top or bottom, so as to extend partially across the same, as shown in Fig. 1, and are so arranged as to leave a space between them and the leaf, as shown in Fig. 2. One of these ribbons is attached to each page of the book, immediately opposite to the other, both being so arranged as to allow the arm, or other device employed in turning the leaves, to pass between them and the leaf, by which means the leaves are lifted by the ribbon.

It is readily seen that with the ribbons arranged as described the arm of any suitable device employed in turning the leaves can readily pass under the ribbon from the upper surface of the leaves when the book is opened, thus turning only one leaf at a time, consequently insuring the adjustment of the leaves consecutively.

I do not wish to confine myself to the use of the ribbons when attached to the leaves of a book when bound, in the usual manner, as the same may be attached to the pages of loose sheets, which will produce the same result when the sheets are connected together or bound in any manner.

Having thus described my invention, I claim—

In combination with the leaves A A of the book, the ribbons B B, arranged to form the loop to receive the arm of the device employed in turning the leaves, as and for the purpose specified.

CYRIL P. BROWN.

Witnesses:
N. H. SHERBURNE,
J. T. WHIPPLE.